United States Patent
Karakaplan (10) Patent No.: US 10,963,861 B2
(45) Date of Patent: Mar. 30, 2021

(54) MOBILE-BASED ELECTRONIC PAYMENT SOLUTION USING SOUND TRANSMISSION BETWEEN PARTIES IN PROXIMITY

(71) Applicant: JPMorgan Chase Bank, N.A., New York, NY (US)

(72) Inventor: Selcuk Karakaplan, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 67 days.

(21) Appl. No.: 16/126,399

(22) Filed: Sep. 10, 2018

(65) Prior Publication Data

US 2019/0087812 A1    Mar. 21, 2019

Related U.S. Application Data

(60) Provisional application No. 62/559,108, filed on Sep. 15, 2017.

(51) Int. Cl.
  *G06Q 20/32* (2012.01)
  *G06Q 20/02* (2012.01)
  *G06Q 20/10* (2012.01)
  *H04B 11/00* (2006.01)

(52) U.S. Cl.
  CPC ........ *G06Q 20/3272* (2013.01); *G06Q 20/02* (2013.01); *G06Q 20/10* (2013.01); *G06Q 20/322* (2013.01); *G06Q 20/3278* (2013.01); *H04B 11/00* (2013.01)

(58) Field of Classification Search
  CPC .... G06Q 20/3272; G06Q 20/02; G06Q 20/10; G06Q 20/322; H04B 11/00; H04L 9/30
  USPC ........................................................... 705/38
  See application file for complete search history.

(56) References Cited

U.S. PATENT DOCUMENTS

| | | | | |
|---|---|---|---|---|
| 8,316,237 | B1 * | 11/2012 | Felsher ................. | H04L 9/0825 380/282 |
| 8,479,983 | B1 * | 7/2013 | Block .................... | G06Q 20/18 235/379 |
| 8,874,477 | B2 * | 10/2014 | Hoffberg ............ | G06Q 10/0631 705/37 |
| 10,032,144 | B1 * | 7/2018 | Jacob .................... | G06Q 20/403 |
| 2010/0274678 | A1 * | 10/2010 | Rolf ........................ | G06Q 20/04 705/17 |
| 2012/0310743 | A1 * | 12/2012 | Johri .................... | G06Q 20/204 705/14.58 |
| 2013/0124413 | A1 * | 5/2013 | Itwaru ................ | G06Q 20/4012 705/44 |
| 2013/0185214 | A1 * | 7/2013 | Azen .................. | G06Q 20/3272 705/76 |

(Continued)

*Primary Examiner* — Kirsten S Apple
*Assistant Examiner* — David Esteban Berroa
(74) *Attorney, Agent, or Firm* — Greenblum & Bernstein, P.L.C (57) ABSTRACT

A method of and system for wirelessly transmitting a tip from a tipper to a tippee is disclosed. The method and system each eliminate the need for a tipper to make a cash payment to a service provider. The method and system employ a sound-based technique for transferring payment information from a tipper to a tippee. The method and system also enable the tippee to deposit the tip amount into an account that is configured such that the tip is automatically dispersed to a group of service providers according to a predetermined allocation schedule.

17 Claims, 9 Drawing Sheets

(56) References Cited

U.S. PATENT DOCUMENTS

| | | | | |
|---|---|---|---|---|
| 2014/0108252 A1* | 4/2014 | Itwaru | ............... | G06Q 20/3276 |
| | | | | 705/44 |
| 2014/0372288 A1* | 12/2014 | Hamblet | ............... | G06Q 20/02 |
| | | | | 705/39 |
| 2015/0278773 A1* | 10/2015 | Rolf | ............... | G06Q 20/02 |
| | | | | 705/39 |
| 2015/0287021 A1* | 10/2015 | Itwaru | ............... | G06Q 20/3276 |
| | | | | 705/44 |
| 2016/0086156 A1* | 3/2016 | Deshpande | ............ | G01S 1/725 |
| | | | | 705/40 |
| 2017/0061421 A1* | 3/2017 | Palmer | ............... | G06F 3/04842 |
| 2018/0276769 A1* | 9/2018 | Mizon | ............... | G06Q 50/12 |
| 2019/0087812 A1* | 3/2019 | Karakaplan | ........ | G06Q 20/3272 |

\* cited by examiner

MOBILE-BASED ELECTRONIC PAYMENT SOLUTION USING SOUND TRANSMISSION BETWEEN PARTIES IN PROXIMITY

CROSS REFERENCE OF RELATED APPLICATIONS

This application claims priority to U.S. provisional patent application 62/559,108 filed on Sep. 15, 2017, which is incorporated herein by reference in its entirety.

FIELD

The present invention relates generally to a method of and system for providing a monetary amount from a first party to a second party using a first mobile device communicating with a second mobile device via soundwave transmission.

BACKGROUND

Tipping is a common method of providing an incentive or reward for good service. Known methods of tipping generally involve a monetary payment from an individual receiving service to the person or persons providing the service. These sorts of payments are often given at the end of a meal or the provision of some sort of service. Providing a tip (also referred to as a gratuity) at the end of a meal may be relatively easy for the payer of the tip ("tipper"). Money is already exchanged to pay for the meal and generally, the tipper has time to consider the amount of the tip and some general guidance with regard to the amount. However, there are many circumstances in which the tipper and the person receiving the tip (the "tippee") are not in such a static environment. For example, a valet may have just delivered the tipper's automobile, or a bellman may be delivering luggage to a guest's hotel room. In such situations, there is often not time for the tipper to pause and consider how much to offer the valet. In other circumstances, the tipper may not want to pay cash when providing a tip, may not have the correct amount, or simply may not have available cash with which to pay. In other situations, the tipper may not know how much to offer as a tip for good service. What is needed is a system and method that facilitates the transfer of a tip from the tipper to the tippee without using cash when there is no prior financial relationship between the two parties.

SUMMARY

Exemplary embodiments comprise a system for and method of providing a financial reward for good service from one person to another. Such embodiments permit a tipper to make a cashless/cash-free payment to a person with whom they have had no past financial relationship and do not require creating such a relationship to offer the tip amount. Additionally, exemplary embodiments of the invention do not require that the tipper and tippee exchange predetermined identifying information which may be socially awkward, examples of which include, without limitation, telephone numbers and email addresses.

Exemplary embodiments detect the user's location and use that location to identify an activity that is associated with the provision of a tip. Still other exemplary embodiments identify the activity and location and provide a suggested tip amount based on what could be customary for the activity and location. An exemplary embodiment identifies the tippees in the vicinity of the tipper (and in some embodiments the typical position, role, or service provided by the tippee) and present a list of those tippees so that the tipper can identify the individual providing the service. In an exemplary embodiment, the tippee may be an organization rather than an individual service provide. Such an arrangement may permit the organization to allocate a tip between various individuals providing service.

In order to facilitate the transmission of tip information between individuals who may have not had any prior relationship, embodiments use sound waves to transmit and receive the information required to identify potential recipients of a tip in order to arrange the transfer of the tip amount awarded from the tipper to the tippee. An exemplary embodiment comprises a computerized device that is configured to transmit a series of sounds that comprises information about the tipper and facilitates the transfer of a tip amount to a tippee. An exemplary embodiment also comprises a computerized device that is configured to receive sounds that serve to identify potential tippees in proximity to the computerized device. An exemplary embodiment displays a list of potential tippees on the computerized device such that a user may select a service provider to which a tip is awarded. Embodiments of the invention also provide feedback regarding the service received using sound wave transmission of feedback data.

In certain exemplary embodiments, a bank or other third-party provider maintains information regarding the tippees and tippers. Additionally, that third party may also act as the transferor of funds from the tipper to the tippee or a business with which the tippee is associated.

In certain exemplary embodiments, a business with which the tippee is associated may act as the transferor of funds. In such embodiments, the business may maintain a list of users or another third-party may maintain and provide tippee and tipper information to the business. In such embodiments, the business may aggregate transactions from the tipper to various tippees and invoice the tipper a single time. For example, in such an embodiment, the business may be a hotel and add an invoice item to the tipper's bill for all tips made during a stay at the hotel. This can have the effect of reducing the transaction cost by conducting a single transaction between the business and the tipper's bank.

BRIEF DESCRIPTION OF THE DRAWINGS

These and other features and advantages of the present invention will become better understood with regard to the following description and accompanying drawings in which.

DETAILED DESCRIPTION

Tipping service providers is a common occurrence. Generally, a tipper (the person making a payment intended as an incentive or reward for good service) makes a small payment to a service provider such as, by way of example, waiters, valets, or other such persons (referred to herein as a tippee). These payments may be made in cash; however, a tipper may alternatively wish to provide the tip using a credit card or another method.

Non-cash monetary payments to individuals is known, however, such payments often require the tipper to swipe or enter their credit card into a card reading device. This process has many disadvantages for certain types of tipping transactions, not the least of which is the cumbersome nature of swiping or inserting a credit card into a card reader and the potential risk of a fraudulent transaction. This is particularly the case with tips as there is not generally a relationship between the tipper and the tippee. Example embodiments provide a method and system for transmitting the details of a tip transaction from the tipper to the tippee such that the tipper does not have to perform the steps of entering their credit card information in order to provide a tip especially for a relatively minor service.

Other non-cash payment methods include person to person (P2P) payments which involve obtaining identifying information for one or both parties such as an email, username, or telephone number. In such methods, the parties to the transaction must have previously established a link between the identifying information and a financial account. The parties then exchange the identifying information for use in the scheduling of a payment from a first financial account to another. Such methods require the parties to exchange their identifying information in order to perform the payment. Exemplary embodiments of the invention permit a tipper to pay a tip to a tippee without the inconvenience and likelihood of errors that might result from communicating identifying information during the short time and conditions that may exist when a tipper wishes to pay a tip.

Figure 1:
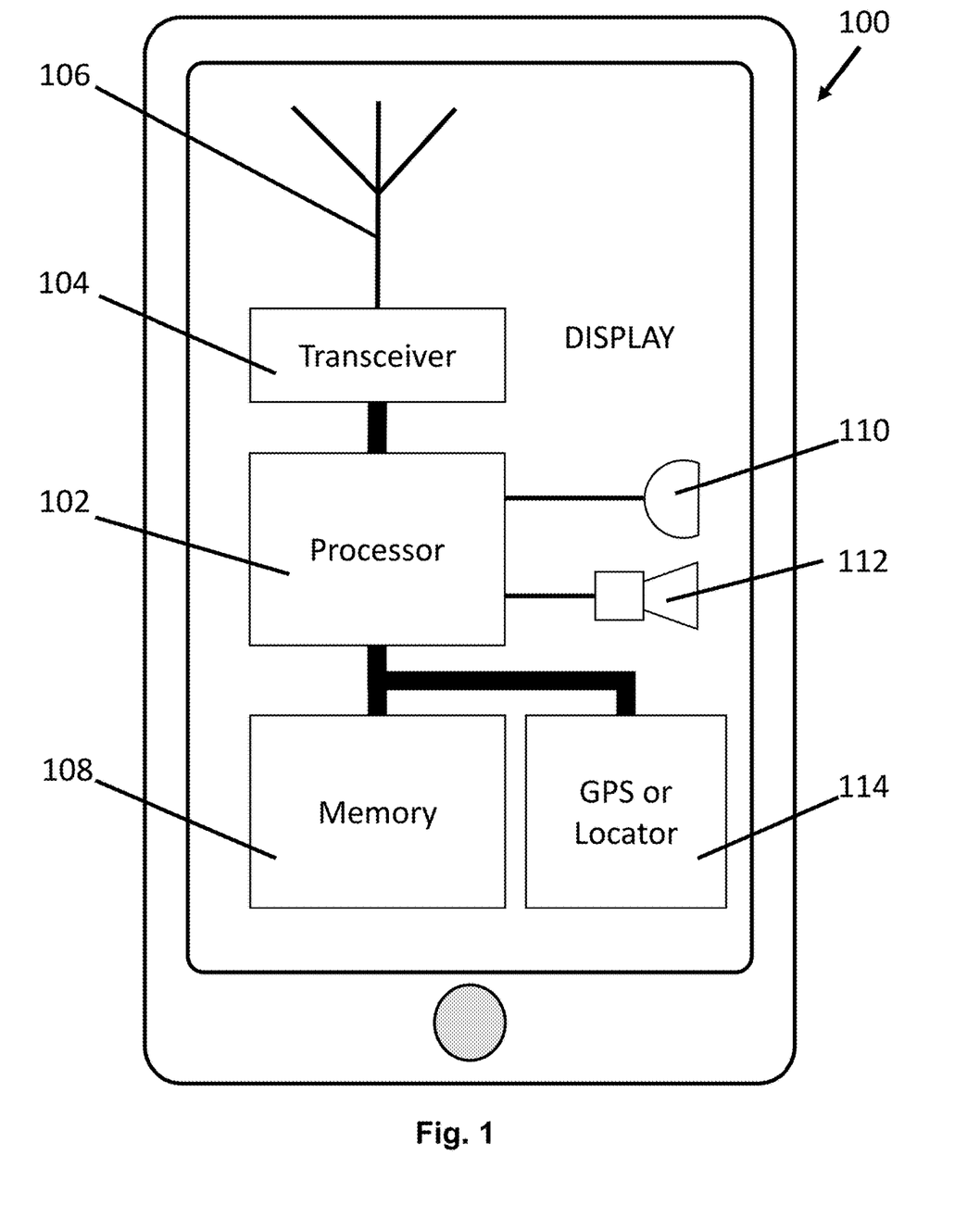
FIG. 1 shows a diagram of a portable device according to known embodiments of such devices.

FIG. 1 illustrates an exemplary embodiment of a portable device 100 configured to provide small payments from a payee (tipper) to a recipient (tippee). As is shown, a portable device 100 comprises a processor 102, a transceiver 104, an antenna 106, memory 108 which comprises software instructions, a sound receiver 110, a sound transmitter 112, and a GPS or other proximity detecting device 114. A portable device 100 also generally comprises a display device. These devices are in electronic communication with the processor 102 such that the processor 102 may send and receive data signals through the transceiver 104. The processor is also in electronic communication with the sound receiver 110 and sound transmitter 112 and display. The portable device 100 may execute software instructions stored in the memory 108. The software instructions configure the processor 102, transceiver 104, display device, sound receiver 110, sound transmitter 112, and GPS or other proximity detecting device 114 to perform the various functions described herein.

In certain exemplary embodiments, the portable device may be comprised of one or more discrete components that are in communication and in combination perform the functions of the portable device described herein. Examples may include, but are not limited to, a mobile telephone in communication with a wristwatch, a mobile telephone in communication with a ring, and a mobile telephone in communication with a broach or other pin.

Figure 2:
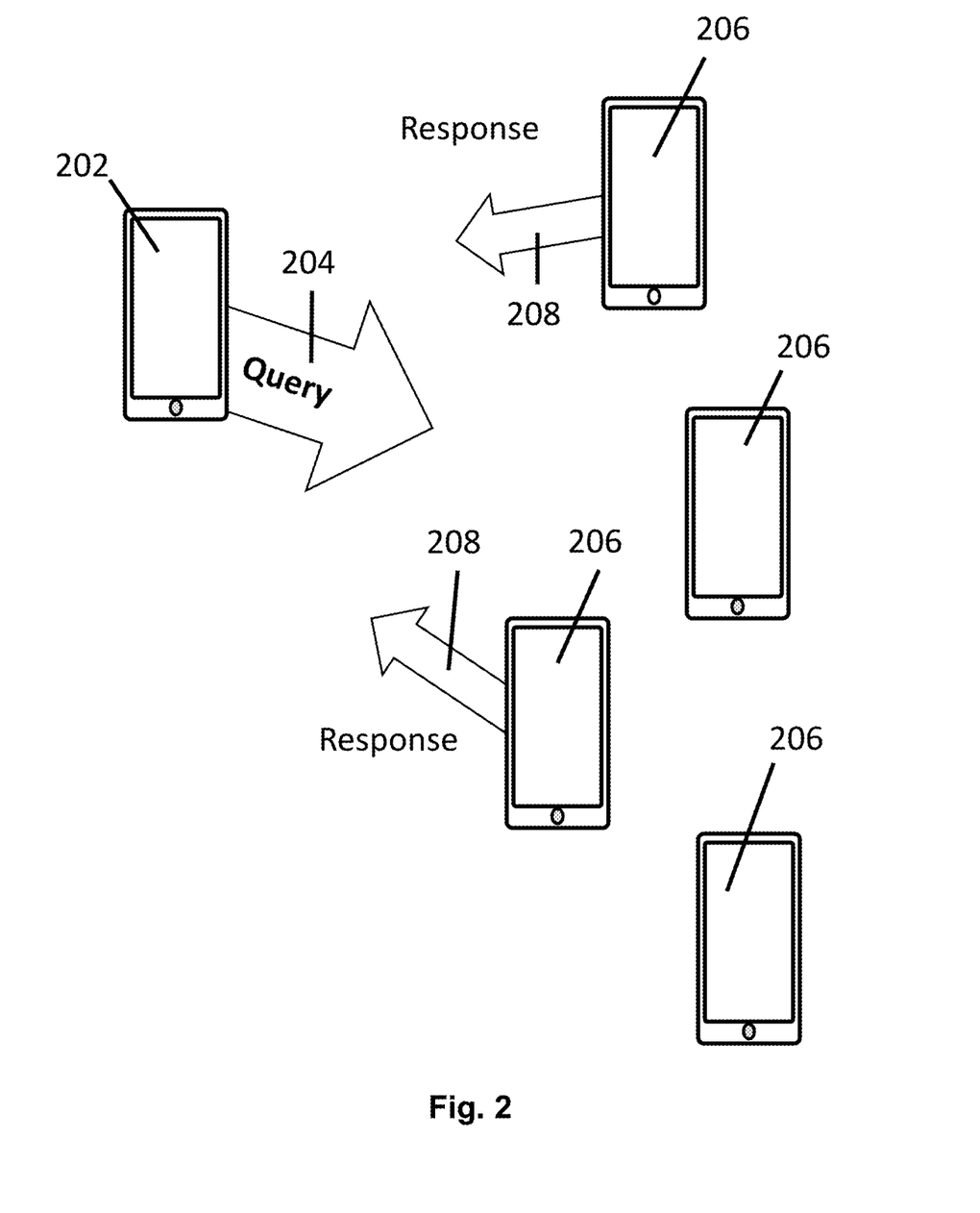
FIG. 2 is diagram illustrating communication among a plurality of portable devices according to an exemplary embodiment of the invention.
Figure 3A:
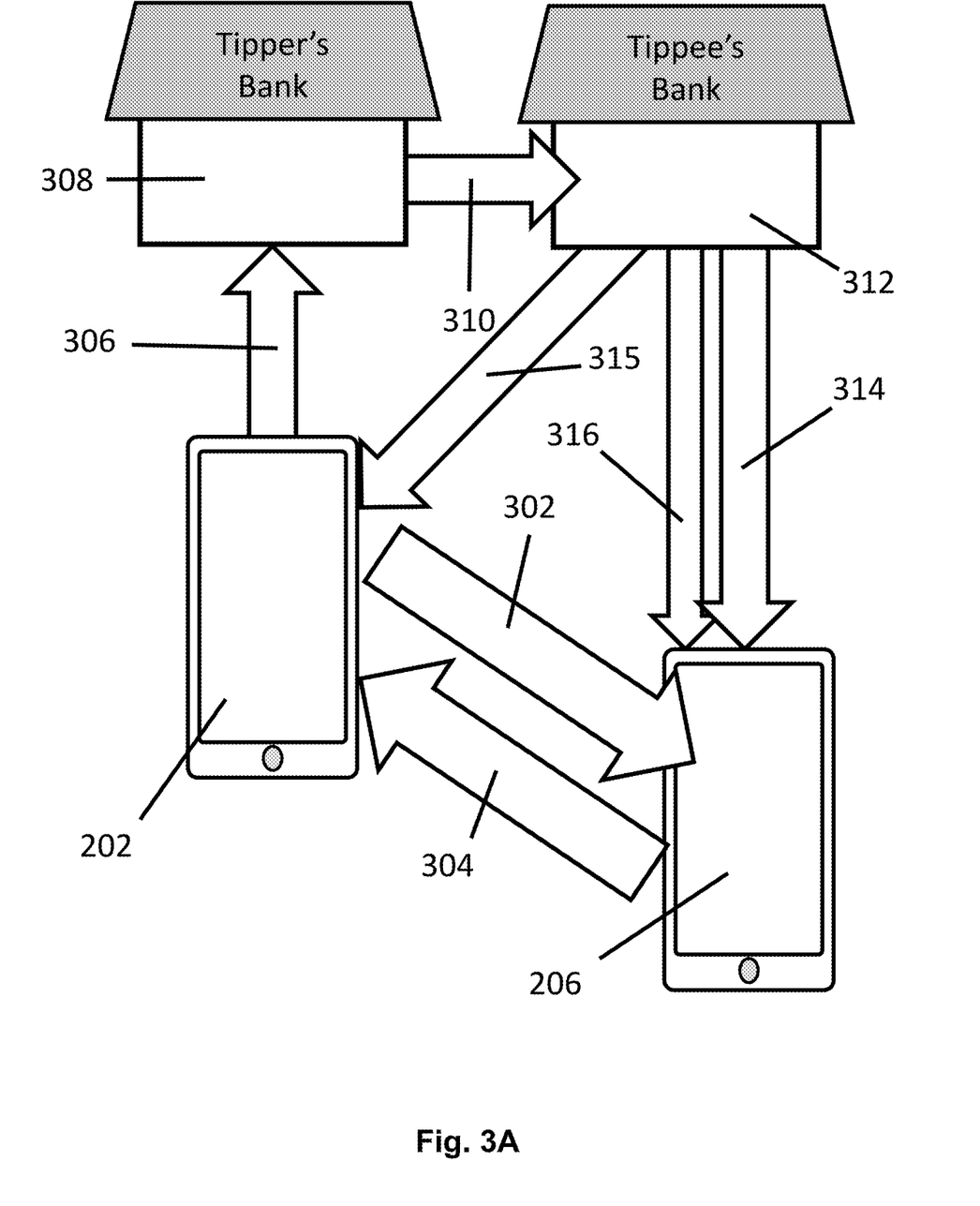
FIG. 3A is a diagram illustrating communication between a tipper's portable device and a tippee's portable device according to an exemplary embodiment of the invention.
Figure 4:
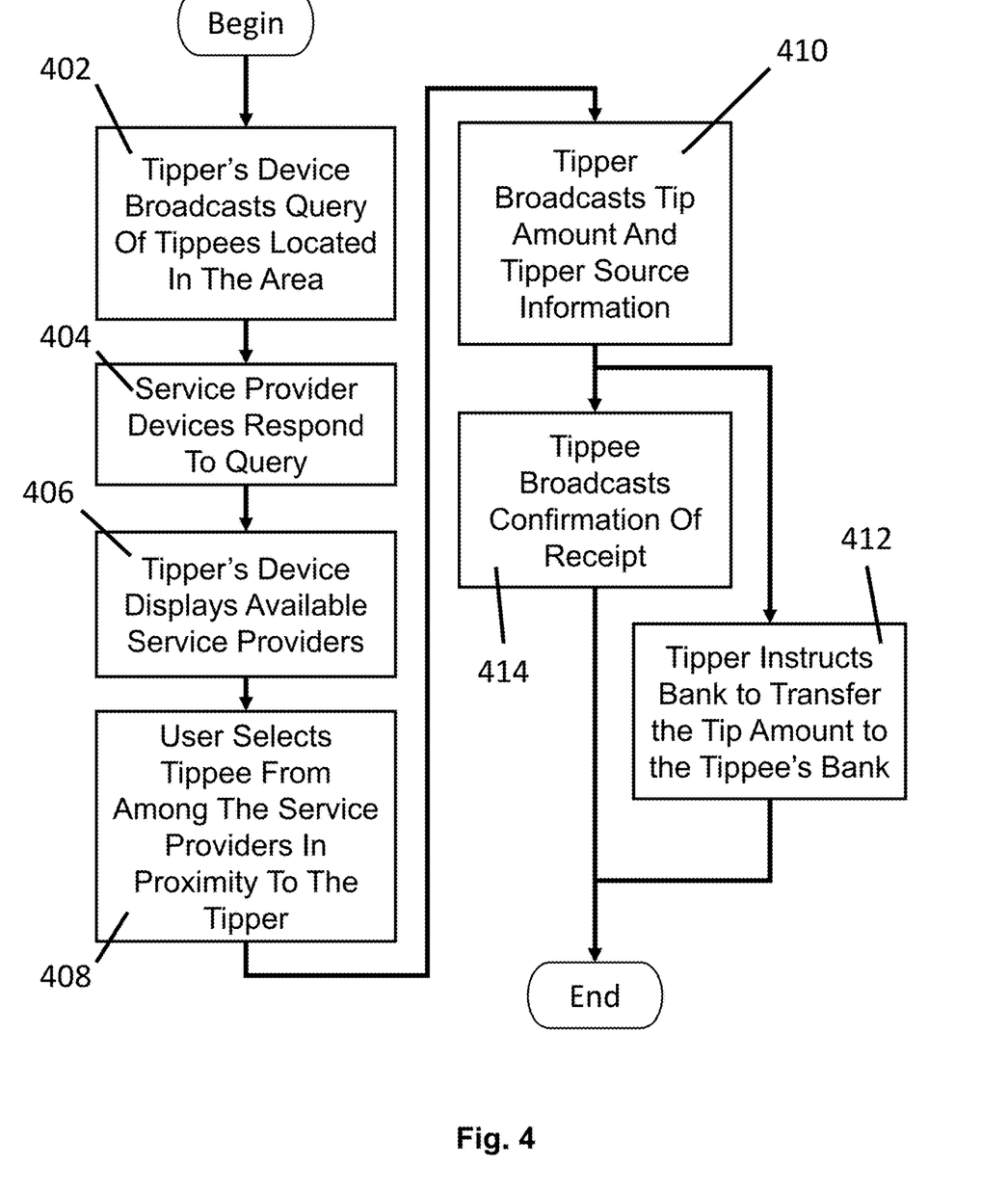
FIG. 4 shows a diagram illustrating the process flow for identifying and selecting a service provider for receipt of a tip according to an exemplary embodiment of the invention.

An exemplary embodiment is shown in FIG. 2. The steps of this embodiment are shown in FIG. 4. In step 402, a first portable device 202 which is associated with a person offering a tip ("tipper") transmits a query 204 which is received by second portable devices 206 that may be associated with a service provider ("tippee") who has or will provide a service to the tipper. As described in step 404, in certain exemplary embodiments, the second portable devices 206 may be configured to automatically respond to the transmitted query 204 with a response 208 indicating the tippee's area of service and some identifying information, such as, without limitation, a picture of the tippee, the tippee's name, a description of the tippee, the tippee's workstation, and the tippee's role (waiter, valet, etc.). Other embodiments may require the tippee to initiate the response 208 after receipt of the query 204 from the tipper. In step 406, the first portable device 202 displays a list of available tippees including identifying information associated with the tippee so that the tipper can identify the tippee providing service. Once the tipper has identified the tippee as shown in step 408, and illustrated in FIG. 3A, the first portable device 202 may transmit a payment signal 302 directed to the second portable device 206 of the selected tippee in step 410. This payment signal 302 differs from the query 204 in that, while it is receivable by other second portable devices 206, it comprises payment information that is specific to the tippee selected by the tipper. The selected second portable device 206 receives the payment signal 302 and records the tip amount contained in the payment signal for viewing by the tippee. In step 414, the second portable device 206 transmits a response signal 304. The first portable device 202 receives this response signal 304 and records the completion of the transaction for viewing by the tipper. In step 412, the first portable device initiates the actual payment by transmitting a payment instruction signal 306 to the tipper's account and/or bank 308. This signal causes the account/bank to transfer funds 310 in the amount of the tip to a tippee's account/bank 312.

In some exemplary embodiments, another type of funds repository may be used rather than a tippee's account or bank. For example, without limitation, a stored value card or other reloadable prepaid card or device. The tippee's bank may then notify the tippee via a confirmation signal 316. The first portable device 202 and the second portable device 206 may provide a notification to the tipper and tippee, respectively, by displaying an image on a display screen, an audible signal, or both. In certain exemplary embodiments, payment instructions may be transmitted to another sort of funding source. Examples might include, but are not limited to, credit cards, debit cards, preloaded payment cards, and preloaded spending accounts. In other exemplary embodiments, funds could be provided to an institution that is facilitating the communications between the tipper and the tippee. These funds could then be transferred to tippees instead of funds being withdrawn from another funding source. Any suitable source of funds, now knowns or later developed, can be a funding source.

Certain exemplary embodiments may charge a service fee to the tipper, the tippee, or both. These fees can be collected by the tipper's bank 308 (or other funding source) from the tipper, from the tip amount, or both. For example, if the amount of the tip is $10 and there is a first service fee of $1 collected from the tipper and a second service fee of 50 cents collected from the tip (in effect, from the tippee), the tipper's bank 308 will withdraw $11 from the tipper's account, collect the $1 service fee from the amount withdrawn and then collect the $0.50 service fee from the tip amount, resulting in a transfer of $9.50 to the tippee's bank 312. In alternate exemplary embodiments, the second service fee may be collected by the tippee's bank 312 rather than the tipper's bank 308. The above amounts are exemplary and not intended to limit embodiments to the disclosed amounts or even require service fees. In addition to the bank-to-bank transfer of fees illustrated in FIGS. 3A & 4, payment may be made using numerous other accounts and methods. Exemplary methods include, but are not limited to, credit card payment systems, stored value cards, and direct payroll deposits. For example, a prepaid card (virtual or actual) may be used to accept the tip for tippees who are underbanked. In some exemplary embodiments, a virtual prepaid card may be integrated into the software running on the second portable device such that the tippee may be able to access the virtual prepaid card to make purchases at merchants who accept prepaid cards.

As illustrated in the exemplary embodiment of FIG. 3A, a third party maintains information regarding the tippees and tippers. In the illustrated embodiment, the third party is the tippee's bank 312. In some exemplary embodiments, this information comprises tippee identifying information and suggested tip amounts. This information is provided to the first portable device 202 as illustrated by the first arrow 315 and the second portable device 206 as illustrated by the second arrow 314. Additionally, the tippee's bank 312 or other third party may also function as the transferor of funds from the tipper to the tippee or a business with which the tippee is associated.

Figure 3B:
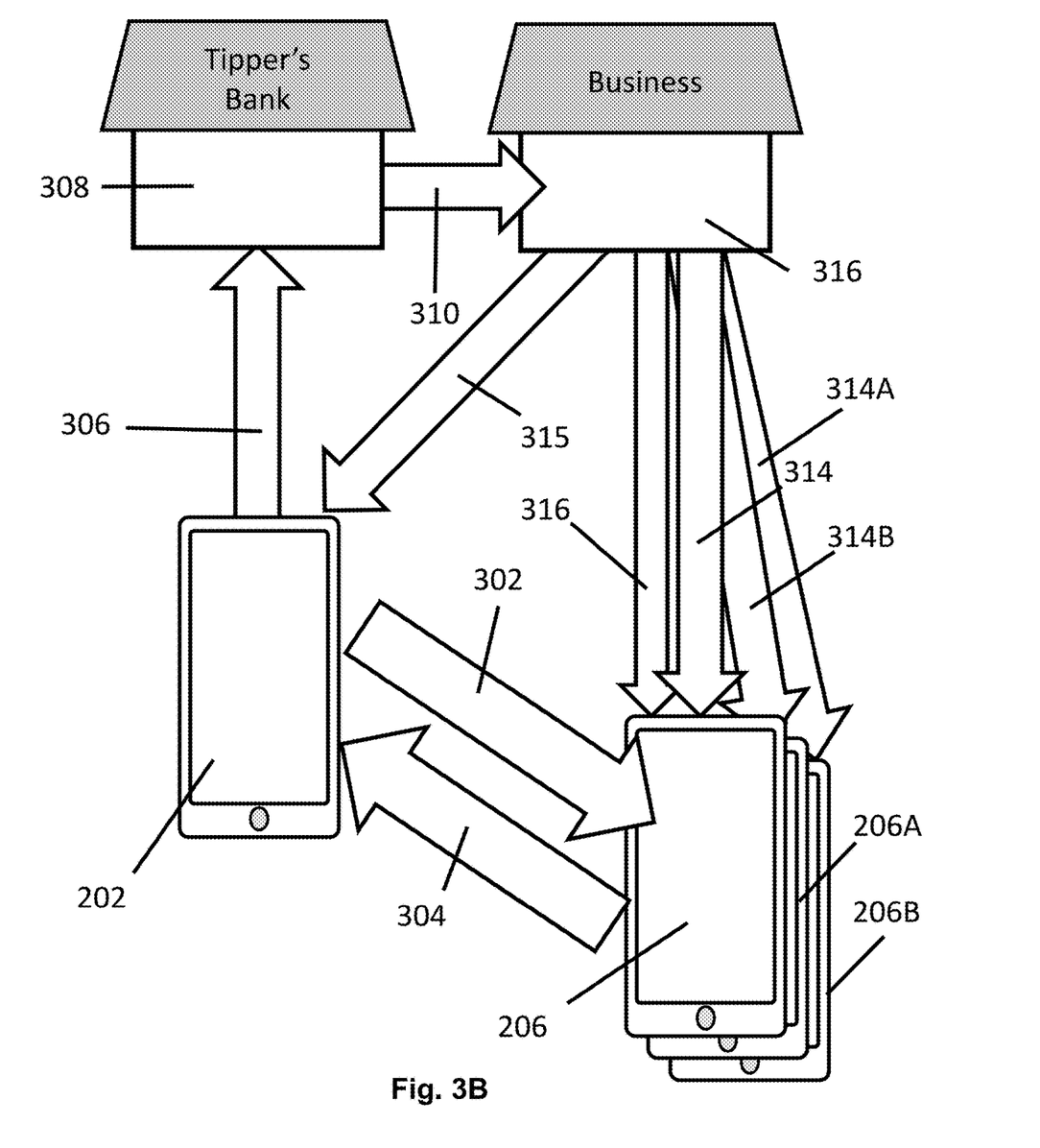
FIG. 3B is a diagram illustrating communication between a tipper's portable device and a tippee's portable device according to an exemplary embodiment of the invention that uses an institution other than a bank to facilitate the transfer of funds from a tipper to a tippee.

In certain other exemplary embodiments, a business with which the tippee is association may function as the transferor of funds. An example of this is illustrated in FIG. 3B. In such embodiments, the business 316 or other third-party may maintain and provide tippee and tipper information to the first portable device 202 and the second portable device 206. At least because there are transaction related fees that are incurred in the transfer of funds between a tippee's bank, the business 316 may aggregate transactions from the tipper to various tippees (the tippees illustrated by a third portable device 206A and a fourth portable device 206B). After the tipper is done providing tips or other payments to the various tippees or when the business 316 is ready to provide an invoice to the tipper, the business 316 initiates a payment from the tipper's bank 308 that comprises the aggregated transaction. In such an exemplary embodiment, the business 316 then disburses the tip amounts to the various tippees (illustrated as 314A and 314B). This practice can have the effect of reducing the transaction cost by allowing the business 316 to conducting a single transaction between the business and the tipper's bank. For example, the business 316 may be a hotel and add an invoice item to the tipper's bill at checkout for the total of all tips made during a stay at the hotel. Once this total is collected by the business 316, the amounts may be allocated to the various tippees or as otherwise appropriate. This type of embodiment may involve the tippee's bank (not illustrated) or may involve a transaction between the business 316 and the tippee directly, for example, as part of a paycheck issued by the business 316 to a tippee.

To facilitate the transmission of tip information between tippers and tippees who may have no prior service relationship, exemplary embodiments use sound waves to transmit and receive the information. This transmitted information is required to identify potential recipients of a tip and also to arrange the transfer of the tip amount awarded from the tipper to the tippee. The use of sound waves enables two or more devices to communicate and transfer information without having a pairing or connection negotiation activity as is the case with other methods of communication such as Wi-Fi and Bluetooth®. As is illustrated in FIG. 1, a portable device 100 typically has a sound receiver 110 and sound transmitter 112. These are utilized by the portable device to transmit and receive audio signals that function as the query 204, response 208, payment signal 302, and response signal 304 that are described earlier herein. The transmitted audio signals may be audible to the human ear but are preferably outside the range of human hearing and thus inaudible. In one embodiment, the audio signals are ultra-sonic. In some embodiments, the audio signals are limited in strength to certain proximity between the users, e.g., less than about ten feet. Exemplary embodiments of the invention are configured such that the audio signals used between the portable devices 100 of the tipper and tippee may be adjusted by the portable devices to achieve a desired level of performance. Such adjustments may be performed to accommodate background or ambient sounds that are within the frequency bands or harmonics thereof of those being used by the invention to transmit the various signals between portable devices 100. In addition to adjustments related to frequency bands, these adjustments may increase or decrease the data transmission rate as needed to optimize data transmission in response to ambient conditions and hardware limitations.

In addition to sound waves, exemplary embodiments of the invention may also employ near-field communication techniques and hardware. In such embodiments, the portable device 100 is configured with a near-field communication transmitter and receiver. In such configurations, the tipper and tippee may position their portable devices in such proximity as to enable the near-field communications hardware to communicate between the portable devices 100 of the tipper and tippee in much the same manner as contemplated by embodiments which use sound waves. In order to realize the same type of benefits as embodiments that utilize sound waves, exemplary embodiments that employ near-field communications would preferably utilize near-field technologies that do not require prior pairing between the first portable device 202 and the second portable device 206.

Figure 5:
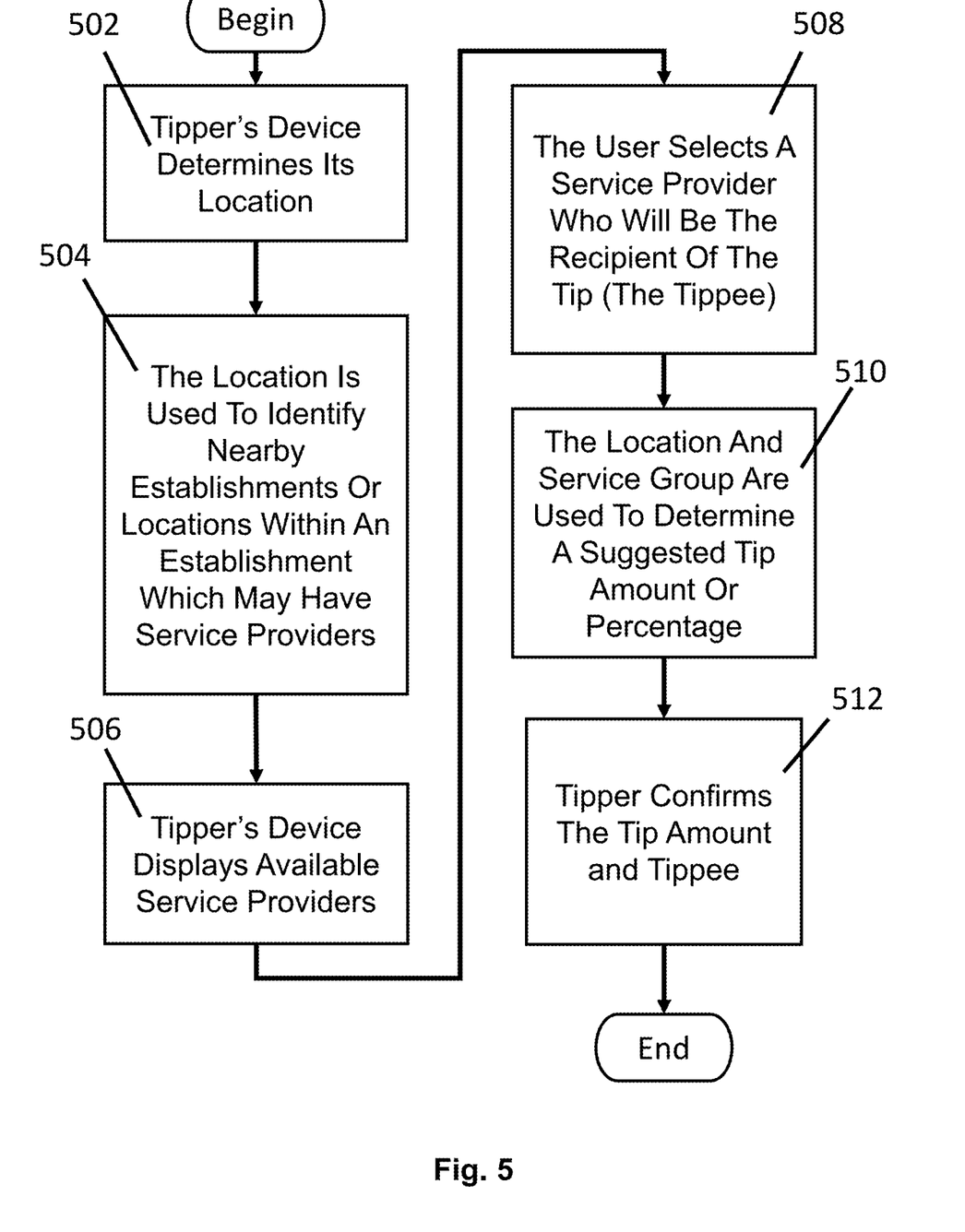
FIG. 5 shows a diagram illustrating the process flow for using the location of a tipper in order to identify service locations and related service providers according to an exemplary embodiment of the invention.
Figure 6:
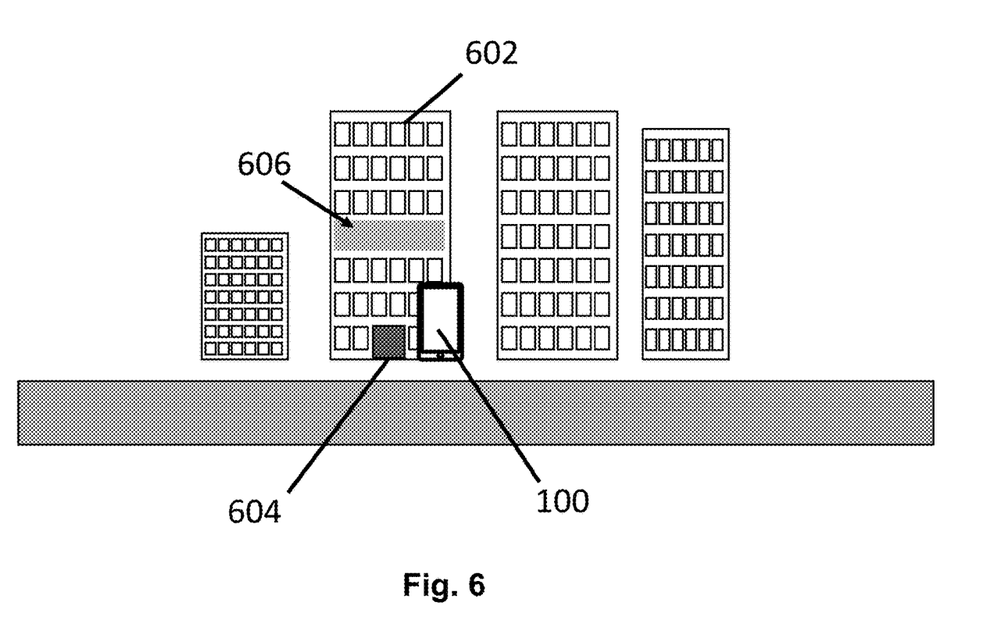
FIG. 6 is a diagram illustrating the location of a tipper's portable device in relation to various service locations according to an exemplary embodiment of the invention.
Figure 7:
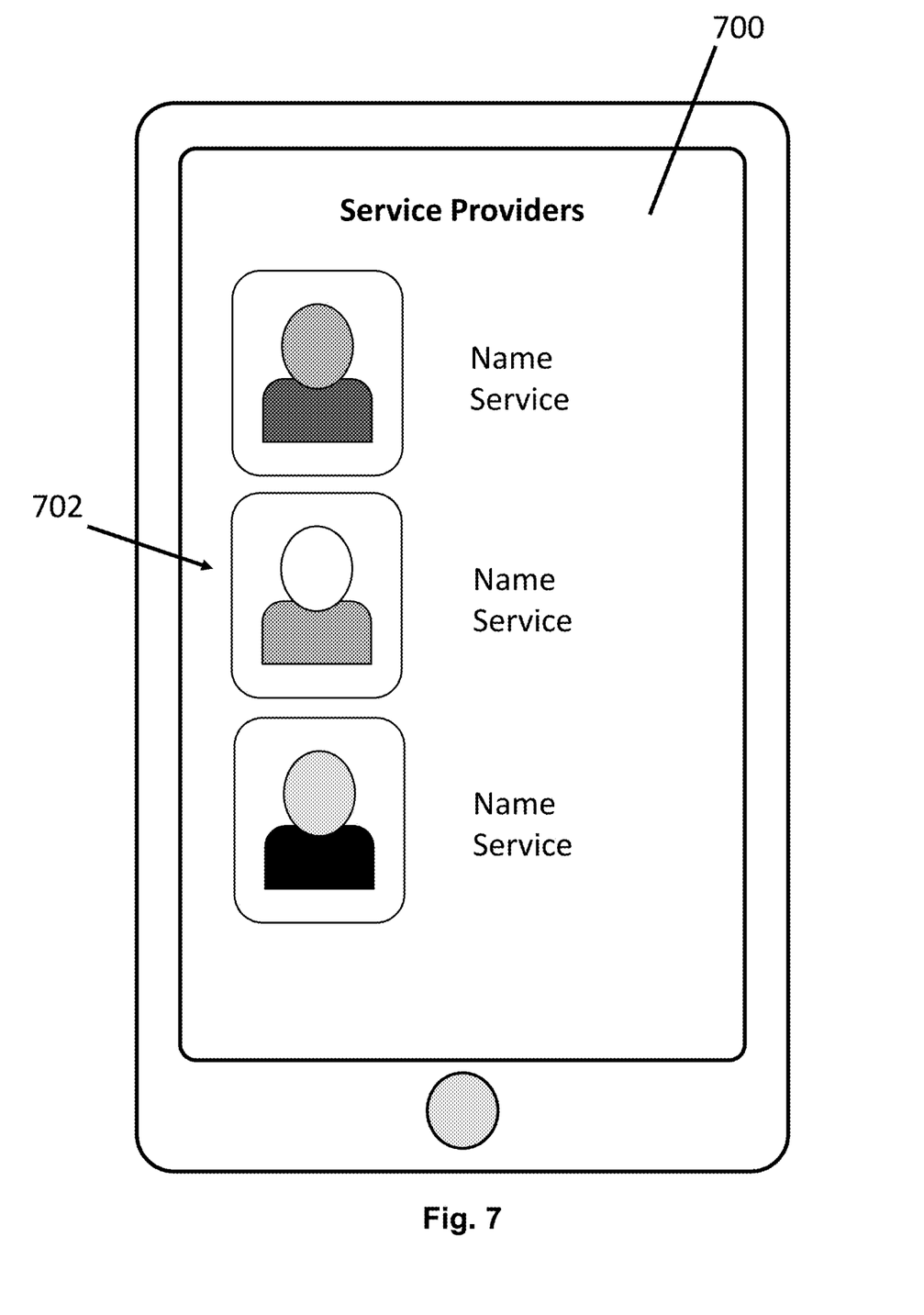
FIG. 7 is an illustration of a user interface presenting a list of service providers, names, and services offered according to an exemplary embodiment of the invention.
Figure 8:
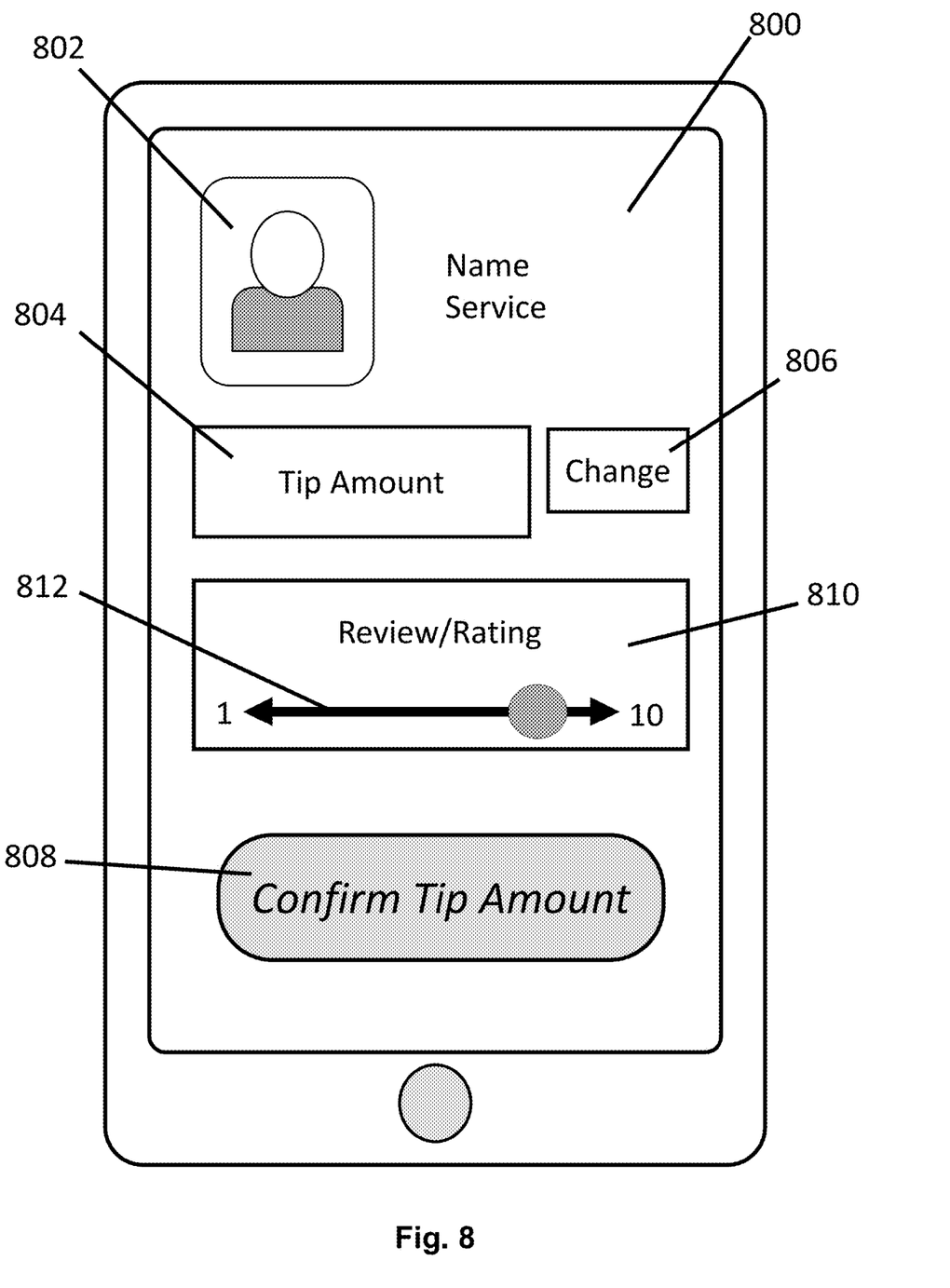
FIG. 8 is an illustration of a user interface presenting a service provider and various controls to select a tip and provide a rating of the service provider according to an exemplary embodiment of the invention.

In an exemplary embodiment, the portable device 100 may be equipped with a GPS or other proximity detection devices 114. The location detected by the portable device 100 is used to identify services and service providers proximate to the user. The proximity detection devices 114 are also used to identify the tipper's likely location and provide suggested tipping based on what is the norm for such a location. In such embodiments, the invention may recognize a venue, determine a suggested tip based on the services offered at the venue, and display that suggestion to a user so that the user only need confirm the venue and identify the tippee who is to receive the tip. In certain exemplary embodiments, the suggested tipping may be based on a fixed amount or a percentage of the cost of a good or service. The determination of a fixed amount or percentage may be user-selectable, or may be determined based on the location of the tipper and local customs. As is illustrated in the flow chart of FIG. 5 and diagram of FIG. 6, a portable device 100 is located at or near a particular building 602. In step 502, the portable device 100 determines its location. In the exemplary embodiment, the building 602 houses a hotel. In step 504, the portable device uses proximity devices 114 to determine that the portable device (and thus, the tipper) is located adjacent to a hotel entrance 604. From this information, the exemplary embodiment determines that the tipper is likely at a check-in desk or valet stand. The portable device has also determined by query that there are several service providers in the vicinity. These are filtered to eliminate those that are not associated with the hotel. The remaining service providers are further filtered to eliminate those service providers that are not associated with the tipper's location within the hotel (for example, restaurant associates when a restaurant 606 is located elsewhere in the building 602). In step 506, the remaining service providers are presented to the tipper on a user interface that presents identifying information, such as, without limitation, photographic images of the service providers. An exemplary embodiment of such a user interface 700 is illustrated in FIG. 7. The tipper may view the identifying information 702 for the remaining service providers and select the service provider (the tippee) who the tipper wishes to tip in step 508. The exemplary embodiment then determines that the tippee is a valet. In step 510, the location and the service provided by the tippee are used to determine a suggested tip amount. In step 512, the tipper is presented with a confirm transaction user interface 800, an exemplary embodiment of which is illustrated in FIG. 8. The confirm transaction user interface 800 displays the identifying information 802 for the tippee, the suggested tip amount 804, an option to change the tip amount 806, and a confirm selection 808.

In an exemplary embodiment, the tipper may be prompted to provide feedback or comment with regard to the tippee or establishment in which the transaction leading to the payment of a tip took place. In such an embodiment, the tipper may be presented with a confirm user interface 800 that also has a service rating input portion 810. The service rating input portion 810 may have an input that presents the tipper with a scale 812 on which to rate the service that was received. Other rating sections may include, without limitation, checkboxes, dials, and text entry fields. The received input is provided to the tippee, the establishment, or both so as to allow for correction of any deficiencies and acknowledgment of good service.

In an exemplary embodiment, the tippee may be an organization rather than an individual service provider. Such an arrangement may permit the organization to allocate a tip between various individuals providing service. In such an embodiment, the tipper may still be prompted to authorize the tip amount as would ordinarily be the case but instead of that amount being directed into an account belonging to the tippee, the tip amount is placed into an account that is managed by the organization and distributed among various service providers. For example, it is frequently the case that wait staff share a percentage of their tips with bus persons, bartenders, and kitchen staff. In such an embodiment, the tip from the tipper is directed into an account held by the restaurant. Once the tip has been deposited into the account, the restaurant may disperse the tip to the various functions according to a predetermined distribution formula. In certain exemplary embodiments, the portable device associated with the tippee may be a device that is shared among the various individuals providing service. Such embodiments may be akin to an electronic "tip jar" in that the device is not associated with an individual but instead with the organization. Such a device may be portable but could also be stationary and integrated into a device such as a cash register or sign.

In an exemplary embodiment, the amount of tips awarded to a tippee is automatically tracked such that the tip amounts received by a tippee are summarized for reporting. The summary of such tip amounts may be provided to the tippee or other interested party.

In certain exemplary embodiments, the first mobile device 202 (which is associated with the tipper), may have a software application (application) for performing functions related to the invention, which is the same as the application that is used by the second mobile device 206 (associated with the tippee). In other exemplary embodiments, the software application may be the same for each mobile device and may be configurable to permit a user of the device to act as a tipper or tippee (or in certain embodiments, both).

In certain exemplary embodiments, the functionality required for a tipper or tippee may be provided such that it can be embedded into another application, such as an application associated with a hotel loyalty program. In certain embodiments, the application may be configurable to offer services to a user of the application. Exemplary embodiments may permit a tipper to have multiple profiles, for example, a business profile and a personal profile. These profiles may be configurable such that funds are transferred from different accounts depending upon the profile selected by a user.

In certain exemplary embodiments, various security measures may be implemented. For example, a user may preselect regions from which the tipper's device is permitted to transfer funds. Certain embodiments may employ levels of security including password protection of the mobile device and its ability to transfer funds. Exemplary embodiments may be configured to integrate or otherwise provide transaction information to other applications such as, without limitation, accounting or tax software. Certain exemplary embodiments may be configured to issue or reload a virtual pre-paid card to enable unbanked or underbanked tippees to received funds from tippers.

Exemplary embodiments may be configured to allow the tipper to modify the amount offered as a tip rather than relying on a tip amount calculated by the embodiment.

In an exemplary embodiment, the key parties to a tipping transaction (i.e., the tipper, the tippee and the organization that employs the tippee) may have dedicated user interfaces that enable those parties to perform certain functions and obtain reporting. In such embodiments, the look and feel of each user interface as well as the functionality and the information provided by the user interfaces will be customized for each user type. In an exemplary embodiment, the tipper is able to see history of tips and have the capability to search by institution, tipper, location, amount, service quality, etc. In certain exemplary embodiments, the tipper will be able to send new tips remotely (i.e., without having to be in proximity to the tippee). In certain exemplary embodiments, there will be functionality that enables the tipper to send transaction information to accounting software and expense management systems as well as other reporting and tax solutions in an electronic fashion. In certain exemplary embodiments, the tippee will be able to view a history of tips by tipper, location, institution, amount, etc. In certain exemplary embodiments, the tippee will be able to view an aggregate tip amount collected including reports detailing amounts before and after fees, and before and after applicable taxes. In certain exemplary embodiments, tippees may access reporting that enables the tippee to compare their tipping intake to other tippees in aggregated and anonymous fashion (i.e., percentile comparison). In certain exemplary embodiments tippees will be able to send simple communication to the tipper (e.g., a thank you message). In certain exemplary embodiments, tippees may tip provide information electronically to tax services, accounting services, etc. In certain exemplary embodiments, organizations will be able to view or extract a history of tips by tipper, tippee, location, service quality, etc. Such embodiments may have pre-enabled reports that can be periodically generated. In certain exemplary embodiments users may create custom reporting. In certain exemplary embodiments, organizations will have the ability to send information to payroll systems and to extract information from folio systems if tipping is integrated into such systems.

In certain exemplary embodiments, there will be functionality available to tippers and tippees to enable them to choose not to share individual transaction-level tip amounts given or received. However, the transactions themselves will still be captured containing other attributes and the tip amount may be included in aggregate reports.

While the present invention has been illustrated by the description of embodiments thereof, and while the embodiments have been described in considerable detail, it is not the intention of the Applicant to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A system for electronically transferring a gratuity from a first user to a second user, the system comprising:
    a first portable device associated with the first user, the first portable device including a global positioning system (GPS) location detection application;
    a second portable device associated with the second user, the second portable device in communication with the first portable device, the second portable device including the global positioning system (GPS) location detection application;
    a third party associated with a computer server in electronic communication with the first portable device and the second portable device, the server comprising software instructions which cause the server to:
        receive instructions from the first portable device to provide funds to the second user;
        request the funds from a funding source associated with the first user;
        transfer the funds to the second user;
    the first portable device comprising a memory storing software instructions that when executed, cause the first portable device to:
        detect an identification signal from the second portable device;
        transmit a message to the second portable device requesting an identifier representing the second user;
        receive a response from the second portable device that comprises the identifier;
        transmit a message to the server comprising an instruction to provide the funds to the second user;
    the second portable device comprising a memory storing software instructions that when executed, cause the second portable device to:
        transmit the identification signal to the first portable device;
        receive a request from the first portable device for the identifier; and
        transmit the identifier to the first portable device,
    wherein the first portable device is operable to determine its current location and where the first portable device further comprises software instructions that when executed, cause the first portable device to display a recommended gratuity amount based on a current location of the second portable device.

2. The system of claim 1, wherein the first portable device communicates with the second portable device via sound waves.

3. The system of claim 2, wherein the sound waves are ultrasonic.

4. The system of claim 1, wherein the first portable device communicates with and the second portable device via near-field communication.

5. The system of claim 1, wherein the server transfers the funds to a funds repository of the second user.

6. The system of claim 1, wherein the server transfers the funds to the second user in response to an event.

7. The system of claim 6, wherein the event is payment of an invoice generated by the third party.

8. The system of claim 1, wherein the first portable device further comprises software instructions that when executed, cause the first portable device to receive input from the first user that relates to a service rating; to display a button that enables the first user to adjust the recommended gratuity amount; and to display a button that prompts the first user to confirm the adjusted gratuity amount.

9. A method of transferring a gratuity from a first user to a second user, the method comprising:
    communicating an identifier from a second portable device associated with the second user to a first portable device associated with the first user, each of the first portable device and the second portable device including a global positioning system (GPS) location detection application;
    receiving the identifier at the first portable device, where the identifier represents the identity of the second user;
    identifying a location of the first portable device;
    displaying, on the first portable device, a recommended gratuity based on a current location of the second portable device;
    receiving by the first portable device, a selection from the first user that comprises the identity of the second user and an amount of the gratuity to be provided to the second user;
    transmitting the selection from the first portable device to a computer server associated with a third-party; and
    transferring by the third-party, the amount of the gratuity from a funding source associated with the first user to the second user.

10. The method of claim 9, wherein the first portable device communicates with the second portable device via sound waves.

11. The method of claim 9, wherein the first portable device communicates with the second portable device via near-field communication.

12. The method of claim 9, wherein transferring the amount of the gratuity to the second user comprises transferring the amount of the gratuity to a funds repository associated with the second user.

13. The method of claim 9, wherein transferring the amount of the gratuity to the second user is triggered by an event.

14. The method of claim 13, wherein the event is payment of an invoice generated by the third party.

15. The method of claim 9, further comprising receiving by the first portable device input from the first user that relates to a service rating;
displaying a button that enables the first user to adjust the recommended gratuity amount; and to display a button that prompts the first user to confirm the adjusted gratuity amount.

16. The method of claim 9, further comprising adjusting the amount of the gratuity to account for transaction costs associate with the transfer of the gratuity from a funding source associated with the first user to the second user.

17. A system for transferring a gratuity from a first user to a plurality of second users, the system comprising:
a first portable device associated with the first user, the first portable device including a global positioning system (GPS) location detection application;
a plurality of second portable devices associated with each of the second users, the second portable devices in communication with the first portable device using sounds transmitted between the first portable device and the second portable devices, each of the second portable devices including the global positioning system (GPS) location detection application;
a third party associated with a computer server in electronic communication with the first portable device and the second portable devices, the server comprising software instructions which cause the server to:
receive instructions from the first portable device to provide funds to each of the second users;
upon the occurrence of a triggering event, requesting a funding amount equal to the sum of the funds provided by the first user from a funding source associated with the first user;
allocating the funding amount between the plurality of second users;
the first portable device comprising a memory storing software instructions that when executed, cause the first portable device to:
detect an identification signal from each of the second portable devices;
transmit a message to each of the second portable devices requesting an identifier representing the particular second user associated with each second portable device;
receive a response from the second portable devices that comprises the identifiers;
transmit a message to the server comprising an instruction to allocate the funding amount between the second users;
the second portable devices each comprising a memory storing software instructions that when executed, cause the second portable device to:
transmit the identification signal;
receive a request from the first portable device for the identifier representing its second user; and
transmit the identifier to the first portable device,
wherein the first portable device is operable to determine its current location, and wherein the first portable device further comprises software instructions that when executed, cause the first portable device to display a recommended gratuity amount based on a current location of one of the second portable devices.

* * * * *